(No Model.) 2 Sheets—Sheet 1.

E. C. & A. M. GORDON.
HEDGE TRIMMER.

No. 498,713. Patented May 30, 1893.

Witnesses:

Inventors:
Edward C. Gordon
& Alphus M. Gordon,
By their Attorneys,
C. A. Snow & Co.

(No Model.) 2 Sheets—Sheet 2.

E. C. & A. M. GORDON.
HEDGE TRIMMER.

No. 498,713. Patented May 30, 1893.

Witnesses:

Inventors;
Edward C. Gordon
& Alphus M. Gordon,
By their Attorneys,

UNITED STATES PATENT OFFICE.

EDWARD CHASE GORDON AND ALPHUS M. GORDON, OF CHETOPA, KANSAS.

HEDGE-TRIMMER.

SPECIFICATION forming part of Letters Patent No. 498,713, dated May 30, 1893.

Application filed October 4, 1892. Serial No. 447,802. (No model.)

*To all whom it may concern:*

Be it known that we, EDWARD CHASE GORDON and ALPHUS M. GORDON, citizens of the United States, residing at Chetopa, in the county of Labette and State of Kansas, have invented a new and useful Hedge-Trimmer, of which the following is a specification.

The invention relates to improvements in hedge trimmers.

The object of the present invention is to improve the construction of hedge trimmers, so as to enable them to keep the stubborn hedge plants down to proper limits and to operate at the outer side of a hedge to avoid injuring crops and coming in contact with division fences and the like.

A further object of the invention is to enable the cutting apparatus to be readily controlled, and to be elevated and depressed and moved to the right or left in order to make a straight horizontal cut when the machine is traveling over sloping or uneven ground.

A further object of the invention is to provide a cutting attachment which may be readily applied to and used in connection with an ordinary mowing machine.

The invention consists in the construction and novel combination and arrangement of parts, hereinafter fully described, illustrated in the accompanying drawings and pointed out in the claims hereto appended.

Figure 1:
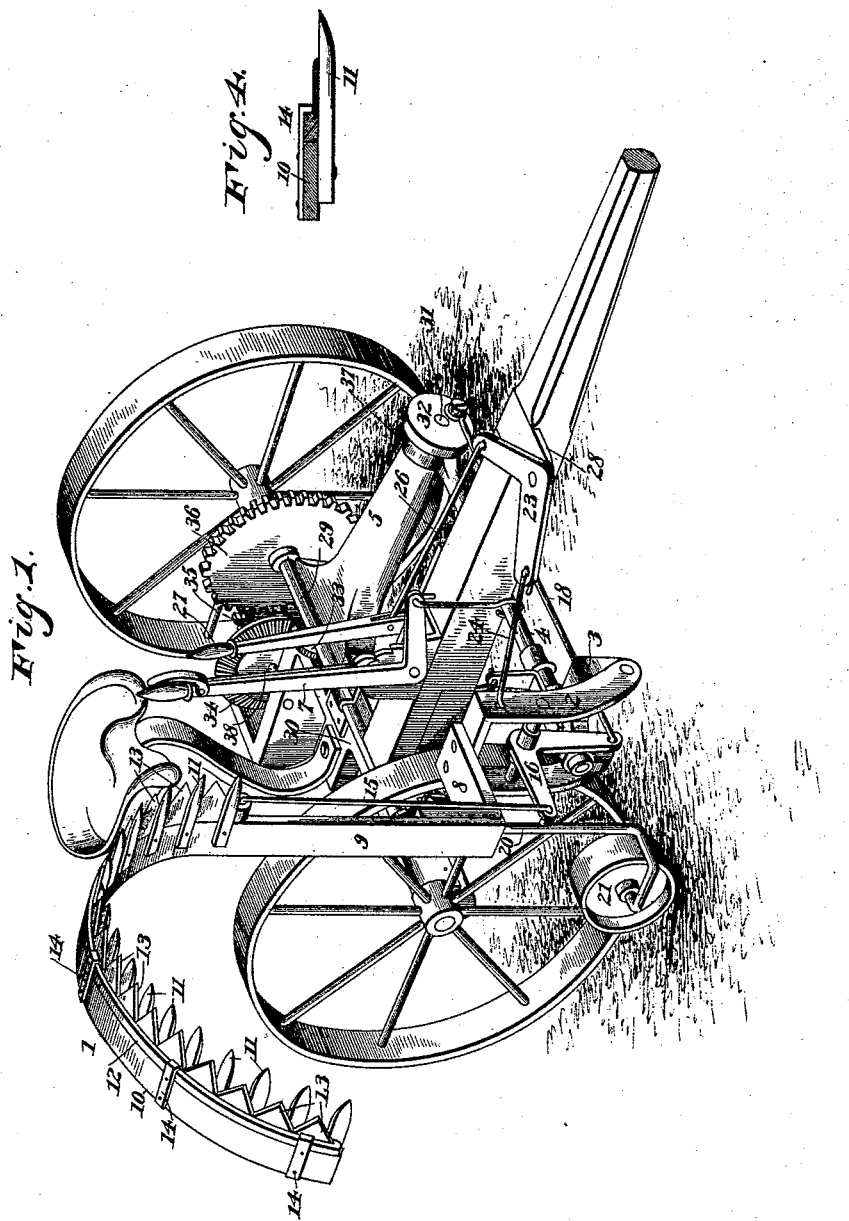
Figure 2:
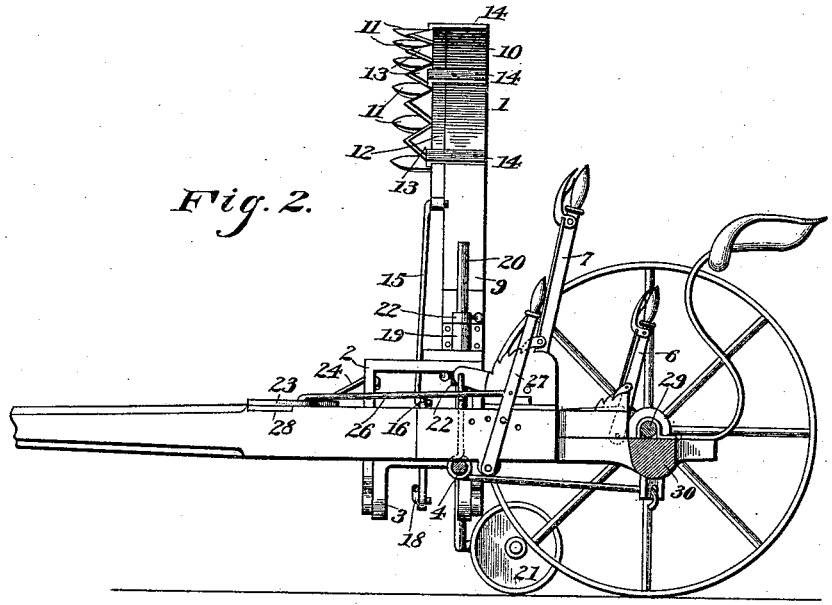
Figure 3:
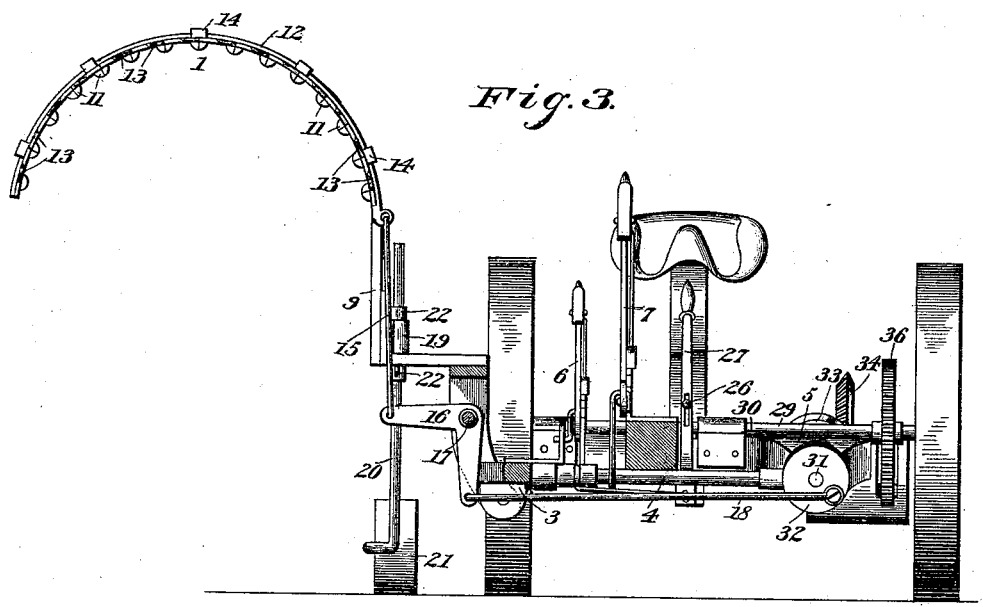

In the drawings—Figure 1 is a perspective view of a mowing machine provided with a hedge trimming attachment constructed in accordance with this invention. Fig. 2 is a longitudinal sectional view. Fig. 3 is a transverse sectional view. Fig. 4 is a detail sectional view of the cutting apparatus.

Like numerals of reference indicate corresponding parts in all the figures of the drawings.

1 designates an arched cutting apparatus adapted to extend over the top of the hedge to the top and sides of the latter, and supported by a vertical yoke 2 which has the lower ends of its sides hinged at the outer faces of opposite sides of an arched bearing 3 to which is ordinarily hinged the cutting apparatus of a mowing machine. The arched bearing 3 is arranged at the outer end of a connecting rod 4 which has its inner end hinged to an extension 5 of the frame, and is connected with a tilting lever 6 while the connecting rod 4 is connected with an elevating lever 7, and the said levers are provided with suitable latches and ratchets to secure them at any desired adjustment as will be readily understood. The yoke 2 which is hinged at its lower end and which is adapted to swing to the right or left, has secured to its top an L-shaped bracket 8 to the vertical arm of which is attached an inner vertical depending extension 9 of an arched finger-bar 10. The finger bar 10 has guard fingers 11 secured to its lower face and projecting forward from it and supporting an arched sickle or cutter-bar 12 which carries knives 13, and which is secured at intervals by stationary clips 14 secured to the upper face of the finger bar and projecting forward therefrom and forming guides for the cutter-bar. The inner end of the cutter-bar is connected by a vertical pitman 15 with a horizontal arm of a bell-crank lever 16 which is fulcrumed at its angle between the sides of the yoke 2 on a pintle rod 17 and is provided at its angle with an eye loosely arranged on the pintle rod 17. The vertical arm of the bell-crank lever is connected to a mower pitman 18, whereby the cutter or sickle bar of the cutting apparatus which is arched is reciprocated.

The L-shaped bracket plate 8 is provided with a vertical socket 19 in which is arranged the stem 20 of a caster wheel 21; and the stem is secured by adjustable collars 22 arranged above and below the socket and permitting the caster wheel to be adjusted to suit the height of the cutting apparatus.

The cutting apparatus is swung to the right or left on the pintle or pivots of its yoke by means of a bell-crank lever 23 fulcrumed at its angle and having one arm extending rearward and connected by a rod 24 with the yoke and having its other arm disposed transversely of the draft pole 25 and connected by a rod 26 with the lever 27 fulcrumed at one side of the draft and provided with a latch and a ratchet plate to secure it in its adjustment.

The bell-crank lever 23 is fulcrumed on a plate 28 secured to the upper face of the draft pole and extending laterally to the outer or cutting side of the machine.

It will be seen that the arched cutting apparatus is under complete control and may be elevated or depressed, swung forward or rearward and moved to the right or left; and that it may be readily applied to most any ordinary mower.

The mower herein illustrated and described has its carrying wheels rigidly connected with the end of the axle 29 and a main frame 30 is hinged to the axle, it has the draft hold secured to it and arranged near the cutting side and it is provided at its opposite side with the bearing extensions 5 in which is journaled a longitudinal shaft 31 having a crank wheel 32 at its forward end, whereby a reciprocating motion is imparted to the mower pitman 18. The rear end of the shaft 31 carries a pinion 33 which is connected by a cog wheel 34 and a pinion 35 with a cog wheel 36 fixed on the axle. The front end of the extension 5 is reduced to form a journal for an eye 37 of the connecting rod 4. The cog wheel 34 and the pinion 35 are fixed on a shaft 38 journaled in a rearward extension of the frame and arranged parallel with the axle. It will be seen that the fingers 11 are secured to the lower face of the finger-bar 10, whereby the blades or knives are arranged to cut in the same plane as the lower face of the finger-bar which is thereby kept out of contact with the cut plants to avoid friction and to enable a hedge to be cut without interference from the finger-bar which would be the case were the knives arranged in the usual manner to cut in substantially the same plane as the upper finger-bar. This is an important feature, and will be found of great advantage in hedge trimming.

Changes in the form and proportion, and the minor details of construction may be resorted to without departing from the principle or sacrificing any of the advantages of the invention.

What we claim is—

1. In a hedge-trimmer, the combination with the connecting bar 4 of a mower, and the bearing at the outer end of the same, of a yoke hinged at its lower end to the bearing, an arched finger-bar provided at its inner end with a depending extension and supported by the yoke, an arched cutter bar mounted on the finger-bar, a bell-crank lever fulcrumed at its angle between the sides of the yoke, and having one of its arms connected with the cutter bar, and a mower pitman connected with the other arm of the bell-crank lever, substantially as described.

2. In a hedge-trimmer, the combination with the connecting bar 4 of a mower, and a bearing at the outer end of the same, of a yoke hinged at its lower end to opposite sides of the bearing, an L-shaped bracket plate secured to the top of the yoke and extending outward therefrom, the arched finger-bar having a depending extension secured to the bracket plate, an arched cutter bar mounted on the finger-bar, a bell-crank lever 16 fulcrumed at its angle between the sides of the yoke, a vertical pitman connecting the cutter bar with one arm of the bell-crank lever 16, a mower pitman connected to the other arm of the bell-crank lever 16, and a bell-crank lever 23 fulcrumed on the tongue and having one arm connected with the yoke, and the lever connected with the other arm of the bell-crank lever 23 and provided with means for securing it in its adjustment, substantially as described.

3. In a hedge-trimmer, the combination of the hinged yoke, the L-shaped bracket plate secured to the yoke and provided with a vertical socket, the arched finger bar having a depending extension secured to the bracket plate, the arched cutter bar mounted on the finger-bar, a caster wheel having its stem arranged in said socket, and adjustable collars mounted on the stem and securing the same in the socket, substantially as described.

In testimony that we claim the foregoing as our own we have hereto affixed our signatures in the presence of two witnesses.

EDWARD CHASE GORDON.
ALPHUS M. GORDON.

Witnesses:
G. S. GILES,
D. FUNK.